(12) United States Patent
Sarma

(10) Patent No.: US 9,881,408 B2
(45) Date of Patent: Jan. 30, 2018

(54) DIGITAL SIGNAL PROCESSING FOR IMAGE FILTERING FIELD

(71) Applicant: David Sarma, Brooklyn, NY (US)

(72) Inventor: David Sarma, Brooklyn, NY (US)

(73) Assignee: David Sarma, Brooklyn, NY (US)

( * ) Notice: Subject to any disclaimer, the term of this patent is extended or adjusted under 35 U.S.C. 154(b) by 0 days.

(21) Appl. No.: 15/223,571

(22) Filed: Jul. 29, 2016

(65) Prior Publication Data

US 2017/0032497 A1 Feb. 2, 2017

Related U.S. Application Data

(60) Provisional application No. 62/198,800, filed on Jul. 30, 2015.

(51) Int. Cl.
*G06T 11/60* (2006.01)
*G06T 3/40* (2006.01)
*G06T 5/00* (2006.01)

(52) U.S. Cl.
CPC ............ *G06T 11/60* (2013.01); *G06T 3/40* (2013.01); *G06T 5/001* (2013.01); *G06T 2207/10024* (2013.01); *G06T 2207/20012* (2013.01)

(58) Field of Classification Search
CPC .......... G06T 11/60; G06T 2207/10024; G06T 2207/20012; G06T 3/40; G06T 5/001
See application file for complete search history.

(56) References Cited

U.S. PATENT DOCUMENTS

| | | | |
|---|---|---|---|
| 2009/0169107 A1* | 7/2009 | Chien | G06T 7/33 382/190 |
| 2009/0262180 A1* | 10/2009 | Kim | G06T 3/4038 348/36 |
| 2011/0243438 A1* | 10/2011 | Hoppe | G06T 3/4007 382/167 |
| 2012/0306904 A1* | 12/2012 | Francois | G06T 7/194 345/589 |
| 2014/0211034 A1* | 7/2014 | Tanaka | G06T 5/002 348/218.1 |

* cited by examiner

*Primary Examiner* — Stephen R Koziol
*Assistant Examiner* — Shaghayegh Azima
(74) *Attorney, Agent, or Firm* — Hogan Lovells US LLP

(57) ABSTRACT

A processor-implemented method and system of this disclosure are configured to correct or resolve artifacts in a received digital image, using a selection of one or more encompassment measures, each encompassing the largest artifact and an optional second smaller artifact. The processor herein is configured to calculate difference in Gaussians using blurred versions of the input digital image and optionally, the input digital image itself; to composite the resulting difference in Gaussians and the input digital image; and to determine pixels with properties of invariant values, also referred to as invariant pixels. The values in the properties of the invariant pixels are then applied to the artifacts regions to correct these artifacts, thereby generating the modified digital image in which the artifact regions are more or less differentiable to a human eye when compared with the digital image.

41 Claims, 9 Drawing Sheets

Image 700

DIGITAL SIGNAL PROCESSING FOR IMAGE FILTERING FIELD

RELATED APPLICATION

This application claims the benefit of priority to U.S. Provisional Application No. 62/198,800 filed on Jul. 30, 2015, the disclosure of which is incorporated by reference in its entirety.

TECHNICAL FIELD

The present disclosure relates in general to the field of image processing, and in particular, to processor-implemented methods and systems for image processing to correct artifacts in digital images.

BACKGROUND

Digital image or image files are often processed after capture to improve select features of the image. In an example, in the fashion industry, it is typical to touch-up images to remove blemishes and other undesired artifacts. The blemishes are removed by attempting to match the color on the blemish with the color in select areas on the rest of the image, and particularly from the areas free of blemishes.

Digital images may be processed using image processing software, including Adobe's Photoshop® and other similar image touch-up software. The resulting image from the processing operation is typically an improvement over the initial image. More often, however, the improvement is a subjective improvement. There is little consistency in the process over multiple mages that endure similar processing, because it is difficult to perform an objective comparison of the blemish color versus the blemish-free regions.

While image processing applications provide tools in an attempt to improve consistency, the matching of colors of the blemish areas to remove the blemishes is still an issue of comparative editing and feature selection. Such features are, however, related to visually distinguishable areas of the image. As a result, the processed image is merely a product limited by visual distinction in certain areas of the image.

SUMMARY

In one aspect, the invention herein provides a processor-implemented method and system for image processing to correct artifacts in digital images. Specifically, the processor implemented method and system of this disclosure are applicable to receive a digital image with artifacts and to provide a modified digital image in which the artifacts have been substantially corrected to make the artifact regions more or less differentiable to a human eye when compared with the digital image.

One aspect of the present invention pertains to a processor-implemented method of processing a digital image to correct artifacts. The processor-implemented method includes receiving, at a processor from a buffer, a digital image comprising one or more artifact regions. The method includes receiving, at the processor, a first selection of a first encompassment measure that encompasses a largest artifact region of the one or more artifact regions and optionally, a second selection of a second encompassment measure that is lesser than the first encompassment measure. A blurring function is performed by the processor on a copy of the digital image, using the first encompassment measure, to generate a first blurred image that is stored in the buffer. A second optional blurring function is performed, similarly, on a copy of the digital image, but using the optional second encompassment measure to generate a second blurred image that is stored in the buffer. A calculating function, by the processor, calculates a first difference of Gaussians of either, the digital image or the optional second blurred image, from the first blurred image and a second difference of Gaussians of the first blurred image from either, the digital image or the optional second blurred image. Thereafter, two compositing functions are performed by the processor. In one compositing function, using the equation $C=\alpha A+(1-\alpha)*B$, a first composited image, C, is generated. In the equation, $\alpha$ is the first difference of Gaussians. A is the digital image, and B is a scaled version of the digital image. In the second composition function, using the equation $E=\beta C+(1-\beta)*D$, a second composited image, E is generated. In the equation for E, $\beta$ is the second difference of Gaussians and D is a scaled version of C that is oppositely scaled than the scaling used for B. In an example, if B is a scaled down version of the digital image then D is a scaled up version of C. Alternatively, if B is a scaled up version of the digital image then D is a scaled down version of C. Typically, the equations and method disclosed herein provides the same correction of artifacts in either scaling examples above. The method includes determining, by the processor, when there are one or more pixels of invariable values in an image resulting from a difference of the digital image from the second composited image. Then a modifying function, by the processor, modifies the digital image, when it is determined that there are one or more pixels of invariable values. The modifying operation includes scaling up and/or scaling down one or more values of pixels in each of the one or more artifact regions to within a predefined factor of the invariable values. The output from the modification function is a modified digital image in which the artifacts in the digital image are substantially corrected in the modified digital image.

Another aspect of the present invention pertains to a processor-implemented system for processing a digital image to correct artifacts. The processor-implemented system includes at least a buffer that is coupled to a processor operating with computer-readable code. The processor is configured to receive, from a buffer, a digital image comprising one or more artifact regions. The processor is configured by the computer-readable code to perform functions as follows. The processor is configured to receive a first selection of a first encompassment measure that encompasses a largest artifact region of the one or more artifact regions and, optionally, a second selection of a second encompassment measure that is lesser than the first encompassment measure. The processor is further configured to perform a blurring function on a copy of the digital image, using the first encompassment measure, to generate a first blurred image that is stored in the buffer. Optionally, the processor is configured to use the same or a different blurring function on another copy of the digital image, but using the second encompassment measure, to generate a second blurred image that is stored in the buffer. The processor is further configured to calculate a first difference of Gaussians of either, the digital image or the optional second blurred image, from the first blurred image and a second difference of Gaussians of the first blurred image from either, the digital image or the optional second blurred image. The processor's configuration allows for two compositing functions that are performed in accordance with the invention herein. In one compositing function, using the equation $C=\alpha A+(1-\alpha)*B$, a first composited image, C, is generated. In the equation, α is the first difference of Gaussians, A is the digital image, and B is a scaled version of the digital image. In the second composition function, using the equation $E=\beta C+(1-\beta)*D$, a second composited image, E is generated. In the equation for E, β is the second difference of Gaussians and D is a scaled version of C that is oppositely scaled than the scaling used for B. In an example, if B is a scaled down version of the digital image then D is a scaled up version of C. Alternatively, if B is a scaled up version of the digital image then D is a scaled down version of C. Typically the equations and method disclosed herein provides the same correction of artifacts in either scaling examples above. The processor includes configuration for determining when there are one or more pixels of invariable values in an image resulting from a difference of the digital image and the second composited image. Further configuration of the processor allows for a modifying function that modifies the digital image when it is determined that there are one or more pixels of invariable values. The modifying operation includes scaling up and/or scaling down one or more values of pixels in each of the one or more artifact regions to within a predefined factor of the invariable values. The output by the processor, following the modification function, is a modified digital image in which the artifacts in the digital image are substantially corrected in the modified digital image.

BRIEF DESCRIPTION OF THE DRAWINGS

The accompanying figures, which are included as part of the present specification, illustrate the various implementations of the presently disclosed system and method. Together with the general description given above and the detailed description of the implementations given below, the figures serve to explain and teach the principles of the present system and method.

DETAILED DESCRIPTION

Figure 1:
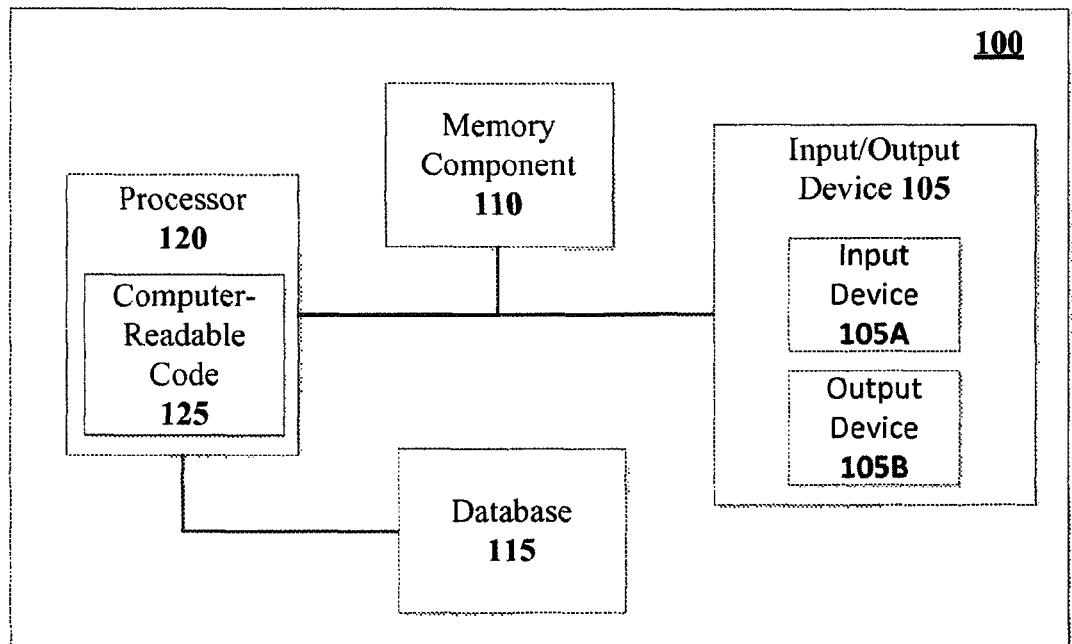
FIG. 1 illustrates a block diagram of a processor-implemented system for image processing to correct artifacts in digital images, in accordance with one aspect of this disclosure.

The invention herein, in one aspect, provides a processor-implemented method and system for image processing to correct artifacts in digital images. Digital images, in one aspect, include frames from a video or motion picture, which have been decompressed and stripped of temporal or inter-frame references and related data. Specifically, the processor-implemented method and system of this disclosure are configured to correct or resolve artifacts in a received digital image, using a selection of one or more areas of any shape. In one example, a circular shape is applied for the selection, where the radii —one for the largest artifact and an optional second smaller reference radius, are received by the method and system herein. When the selection is circular, the radius forms an encompassment measure that defines the size of the circle applied to encompass the artifact. For a square shaped selection, it is understood that the encompassment measure is a side of the square or the diagonal of the square. The processor herein is configured to calculate difference in Gaussians using blurred versions of the input digital image and optionally, the input digital image itself, to composite the resulting difference in Gaussians and the input digital image; and to determine pixels with properties of invariant values, also referred to as invariant pixels. The values in the properties of the invariant pixels are then applied to the artifacts regions to correct these artifacts, thereby generating the modified digital image in which the artifact regions are less differentiable or more differentiable to a human eye when compared with the digital image.

For simplicity in this disclosure, the terms "artifact," "artifact regions," "artifact pixels," "anomaly," and "artifact sub-regions" are used interchangeably with each other and with the term "blemish" to refer to any undesired markings on a digital image contained in a file. For simplicity, the term "digital image" is used interchangeably with the term "image file" to refer to digital image data (or portions thereof) that are contained with a file, as is typical in processor-implemented systems, including cameras, phones, and computing devices. The markings are typically undesirable depending on the intended application for the image file. For example, an image of a face in an image file may include skin discolorations, imperfections, and other related markings that may not be desired for a print publication related to fashion. In another example, a medical image, such as an x-ray image in an image file may include blurred features at a localized level. The blurred features make the x-ray image difficult to read, because of the difficulty in distinguishing density features of the body from the image. In both examples, the face and the x-ray, the artifacts are different. The face artifact is typically resolved to make it less differentiable to the human eye, while the x-ray artifacts are typically resolved to make them more differentiable to the human eye. The artifacts in an x-ray image are typically abnormalities in a patient, for which a high clarity or detail is required for a doctor to analyze. It is then the case that x-ray artifacts are scaled up to make them more apparent to the human eye. Accordingly, it is understood that images pertain to particular applications and the undesired markings change corresponding to the application. In this disclosure, an artifact refers to any undesired marking or a desired abnormality on an image in an image file, corresponding to its application. Correction or resolving of artifacts, therefore, pertains to digital processing, as performed in this application, and includes a scaling up or scaling down function—as required by the application to remove the artifact or make it prominent.

For simplicity in this disclosure, the terms "brightness," "brightness level," and "brightness value" are interchangeably used to refer to luminous intensity of an image or pixels in the image after the image has been captured. The brightness may vary for each pixel in the image. Typically, an image may be adjusted for brightness, hue, saturation, contrast, and at least gamma correction. Brightness, as used herein, is also different from radiant intensity, which is pertinent to reflected light rather than the luminous intensity of the pixels in the image. There is no effect of the type of device used to view the images disclosed herein, as the brightness values or levels of this disclosure are representative of the relative brightness of the image that is free of external influence. Accordingly, the luminous intensity reference to brightness, in this disclosure, refers to a relative measure of brightness of one pixel against all pixels in an image. The use of a relative measure ensures that the image is uniformly adjusted or may be selectively adjusted.

Further, the term "bright" and its variants are used interchangeably with the term "light" and its variants to refer to the pixel luminous intensity as measured by the brightness level described above. Similarly, the term "level," as used herein, is interchangeable with the term "value," both implying a measure of luminous intensity as described above. The term "properties," as used herein, refers to data accorded to each pixel, including at least the values corresponding to multiple or gain; offset or brightness; and gamma. A digital image may be edited by changing its collective properties, which, in turn, proportionally changes the properties' values in each pixel. It is also known to a person of ordinary skill in the art, in the alternative, that to edit a digital image, one can change the properties of individual pixels or groups of pixels using arbitrary values or proportional values.

FIG. 1 illustrates a block diagram of a processor-implemented system 100 for image processing to correct or resolve artifacts in digital image, in accordance with one aspect of this disclosure. The exemplary implementation of FIG. 1 is explained, along with FIGS. 2-5, which illustrate an exemplary digital image 200, including artifacts 215-220, and which is subject to the processor-implemented method 400-500 and system 100 for image processing to correct the artifacts 215-220 in the image file 200. Specifically, the exemplary method 400-500 of processing the image 200 to correct its artifacts 215-220 can be implemented via the exemplary system 100.

In an aspect of the disclosure, intervening colorspace conversion steps may be added between the received image file 200 and subsequent processing steps for resolving artifacts. The intervening colorspace conversion is configured to convert the input digital image from red, blue, green (RGB) colorspace to hue-saturation-value (HSV) colorspace. The HSV colorspace provides a greyscale image or format that accentuates the artifacts in comparison with the RGB colorspace. Format, as used herein, is interchangeable with colorspace, and reflects a data structure layout for an image that is optionally color-dependent. Each colorspace may require a different format or data structure to represent the image. When the intervening steps are in place, the input digital image is first converted to HSV, before any further processing is performed in accordance with the disclosure herein. It is also understood to one of ordinary skill in the art that the implementations herein contemplate using a multi-channel colorspace, e.g., a CMYK colorspace—where each channel, cyan, magenta, yellow and key (e.g., black) is considered a digital image 200; or the RGB colorspace, where each channel—red, green, or blue, is considered a digital image 200.

Accordingly, in the case of an RGB colorspace, the exemplary digital image 200 may be a red channel of the full color digital image that is subject to artifact resolution. Then it follows that the green channel image and a blue channel image are all subject to the same artifact resolution, before being composited to provide the original digital image, with full color support. In such implementations, the RGB channels may be separated prior to entering the system of FIG. 1 or after the digital image 200 is received, but before the blurring functions are performed as detailed below. When the digital image 200 is received as a full color image, then channel separation is performed and the subsequent processing steps are applied to each channel of the full color image 200. In alternate embodiments, the Lab colorpace may be used instead of HSV. The Lab color space represents lightness ("L") and "a" and "b" dimensions for color. Accordingly, an image may be first transformed from CMYK, RGB, or any other multi-channel colorspace to HSV, Lab, or any greyscale colorspace, as known in the art.

A processor 120 is configured via the computer-readable code 125 to perform various functions disclosed with respect to the method 400-500. In a first step, the processor 120 is configured to receive the digital image 200 for processing from an input device 105. This is also illustrated in block 405 of FIG. 4. As described above, the digital image 200 may be a full color digital image, which is first split into the CMYK, RBG, or any multi-channel images, each being subject to the artifact resolution process described herein. Alternatively, the digital image 200 is the full color digital image that is first subject to HSV conversion before further processing is performed. The processor may be any processor configured to perform complex image processing computations. In an example, the processor is a digital signal processor or an image signal processor. This disclosure, therefore, uses processor or digital signal processor or image processor interchangeably to refer to processor 120. The input device 105 is one or more of a touch-sensor on a screen, a keyboard, a mouse, and a stylus. When the input device 105 is a touch-screen, the input device 105 includes the output device component 105B, e.g., monitor; and an input device component 105A, e.g., a capacitive or resistive touch sensor.

Furthermore, the system 100 includes a database 115 from which the image files may be provided to the processor 120. Alternatively, image files may be provided via the input/output device 105. It is also envisioned that the input/output device 105 includes a camera to capture image files and provide them directly to the processor 120, via the memory component 110. Memory component 110 includes a volatile or non-volatile solid state memory for temporary or permanent storage of image files and processing data. For example, the processor is configured to store and access processing data for large image files via the memory component 110. A random access memory (RAM) is most suitable when the processor 120 is communicating with the memory component 110 during processing. Furthermore, the RAM type memory may be configured as a buffer to allow storage of intermediate processing data during the image processing sequences detailed below. This allows for the system 100 to store many iterations of the processed image, where each iteration may be a partial or complete processing of the image data for an image file. In the event that processing changes applied to an iteration of the image file are rejected or corrupted, an earlier version of the image file may be retrieved for continued operations.

One of ordinary skill in the art would understand that receipt of the digital image 200 at the processor 120 typically pertains to receipt of data stored within pixels of the digital image. In an alternate embodiment, the processor 120 may be configured to receive the predefined areas alone e.g., each of the areas 210A-C of the digital image 200 is received separately. In this embodiment, a dual processor or the same processor is configured to separate each region 210AC, and then provide each region separately as a "digital image" for the subsequent processing steps. When using a single processor, the buffer stores the separated regions (also referred to as features or objects of the digital image), and presents them back to the processor as the digital image for subsequent processing. In the case of a dual processor, the first processor is configured for separation of features, which are stored in a corresponding buffer, while a second processor receives and processes further, the separated features from the buffer.

Figure 2:
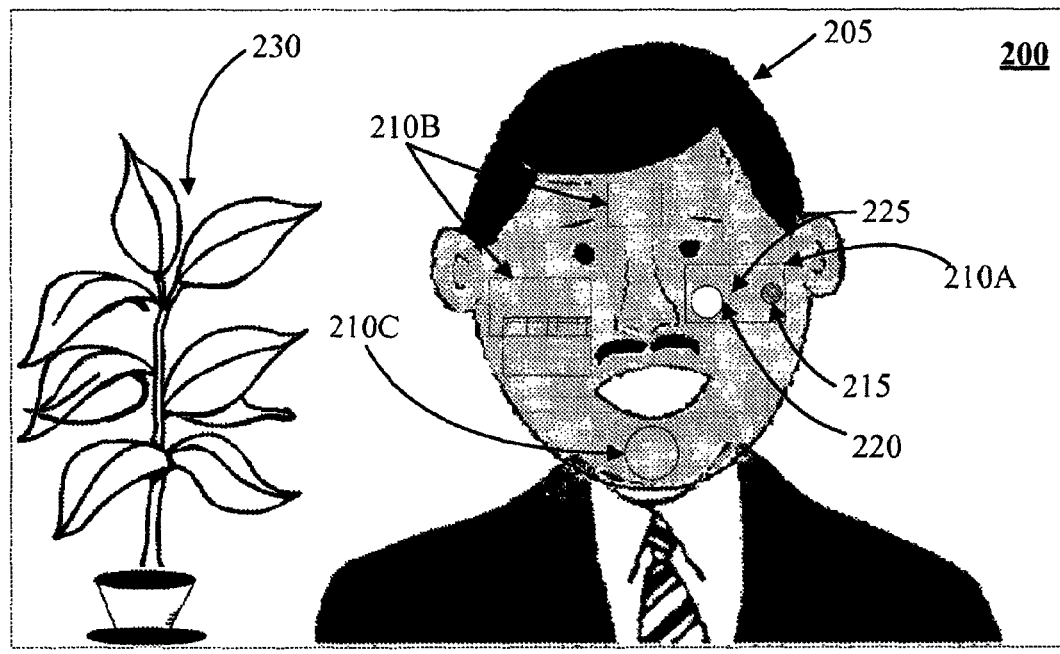
FIG. 2 illustrates an exemplary digital image, which includes artifacts, and which is subject to the processor-implemented method and system for image processing to correct the artifacts.

In the example of FIG. 2, the digital image includes a human face 205 with regions 210AB and a plant 230 in the background. In an alternate embodiment, each object or feature of the digital image e.g., the human face 205 or the plant 230, may represent a separate digital image with artifacts for resolution. Accordingly, feature separation is applicable to separate the human face 205 or the plant 230 as disclosed above; then correcting functions of this invention are separately applicable to any artifacts that exist on each separated feature. Considering the specific case of the human face 205, and even more specifically, the region 210A as the digital mage, the artifacts 215-220 are illustrated as discolorations to the face. The artifacts are typically areas of pixels in which artifact features, for example, brightness, hue, saturation, and/or colors levels, mismatch when compared to neighboring regions of the same facial area. Areas of neighboring regions, include, for example, the rest of the cheek 225 or face 210.

Figure 3:
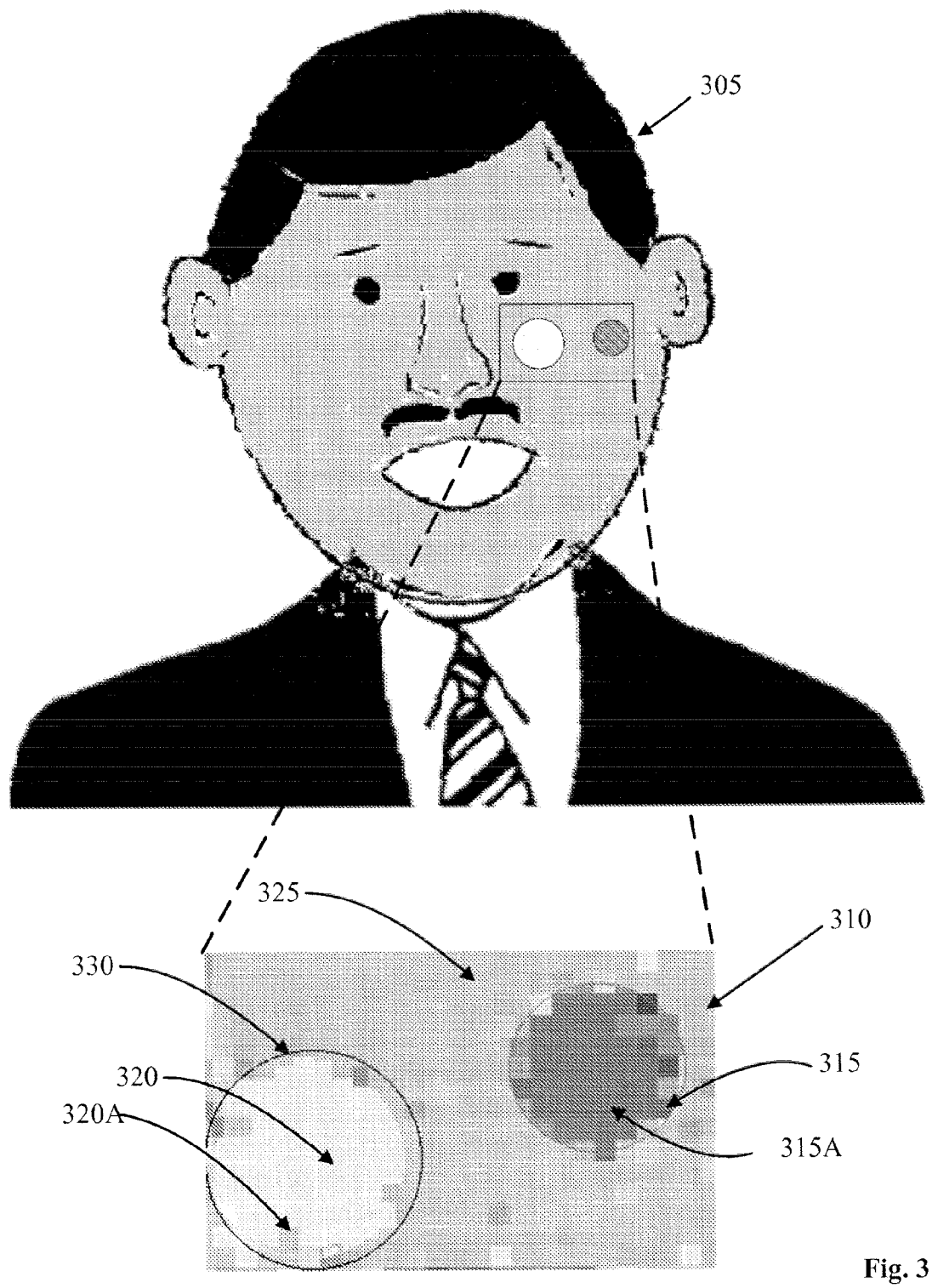
FIG. 3 illustrates blow-up detail of the artifacts from the exemplary digital image of FIG. 2, which is subject to the processor-implemented method and system for image processing to correct the artifacts.

The image illustrated in FIG. 3 is a blow-up of the human face 205 of the digital image 200 of FIG. 2. The image is typically comprised of pixels, illustrated as differently colored blocks. The pixels are further divided into predetermined areas of pixels 310-320 for purposes of illustration. The predetermined areas illustrate the details of artifact regions 315 and 320. Furthermore, the artifact regions illustrate that they are comprised of more differently colored pixels than the neighboring areas 325. Accordingly, a feature separation for the two artifact regions may be performed by a processor using the difference in majority properties of pixels in the areas 315 and 320 in comparison to the general area 310. The artifacts and the features are not clearly divided at the boundary, but feature separation includes certain pixels of different colors as well, while retaining a majority of pixels of different color from the rest of the image.

In FIG. 3, the artifact sub-regions 315-320 are generated in accordance to each of the predetermined areas 330. While the artifact areas are illustrated as circular, it may also include other shapes, such as square areas. Furthermore, the artifact areas may be exclusive or overlapping. For example, artifacts 315 and 320 are illustrated as exclusive. In cases where differently colored artifacts overlap, it may be considered as a single artifact.

The boundary lines for the first region 210A (or 310 in FIG. 3) and the artifact sub-regions 215-220 (315-320 of FIG. 3) are merely for illustrative purposes. The discolorations within the artifacts 315-320 can represent actual artifacts on the human face 305. Furthermore, the artifacts are illustrated as having a darker aspect 315 and a lighter aspect 320. These aspects, however, are not limited to brightness, but also represent regions of different colors, hue, saturation, etc., than the remaining area or even the neighboring areas 325. Accordingly, as used herein and for the purposes of simplicity, any reference brightness mismatch as an artifact is interchangeable with mismatches as to one or a combination of color, saturation, hue, and other properties of the digital image.

In a second step pertaining to the correcting of artifacts, the processor 120 is also configured to receive multiple selections pertaining to the digital image 200. This is illustrated via functional block 410 of FIG. 4. The reference to selections in this disclosure are typically areas, regions, sub-regions 315-320, or pixels 315A-320A on the image within the digital image. Computer-readable code 125 executing on processor 120 configures the processor to generate such selections using feature separations methods as discussed previously and in further detail below. The computer-readable code 125 is illustrated in FIG. 1 as within the processor 120 merely to signify that it is executed by the processor. Accordingly, the computer-readable code 125 is stored application code form the memory component 110 or in a cache memory structure within processor 100. Furthermore, computer-readable code 125 in this system includes C/C++/C# and other objected oriented languages. Alternatively, processed firmware or processor-specific embedded code is applicable for faster computation in processor 120.

In another example, the multiple selections as to the image file are selections that correspond to predefined areas of the image in accordance with its intended application. For example, a human face may be divided into four regions or predefined areas—e.g., the forehead, the chin, and either side from the nose to the corresponding ear of the side. The predefined areas are typically automated by the computer-readable code 125 using feature separation processes, but in a further aspect of this disclosure, the predefined areas are provided from user input to the processor 120, via the input/output device 105. A feature separation process uses a smart learning program, such as a neural network program that is trained by a database of human faces, and that is then configured to identify features that specifically distinguish human faces automatically based on the features in the database.

As part of the receiving functions of block 410, the processor 120 receives a first selection 330 of a first encompassment measure (e.g., a radius for a circular shape) encompassing a largest artifact region 320 of the one or more artifact regions 315-320. In an example, the radius is in units of pixels and is marked with a dark boundary for illustrative purposes. The selection may not include an actual marking if done using the feature separation methods. Accordingly, the artifact region with lighter color 320 is an exemplary artifact region that is fully encompassed by a circular selection 330 with a pixel radius representing the largest radius among the two artifacts 315-320. An artifact itself may be of any shape or size, while the selection of the first region encompassing the artifact may be of any shape as well, including a square or circular shape. In an aspect of this disclosure, the first selection, when effected automatically by feature separation, is done using a statistical survey of the brightness or any of the values of all pixels in the first region 310, but excluding the artifact sub-regions 315-320.

The statistical survey is a statistical measure of the mean, median, and mode of the artifact feature values of all pixels in the region of the face 310, including the artifact regions 315-320. For example, if the mean, median, and mode brightness values of all qualified pixels in the area 310 differ by statistically insignificant percentage, i.e., 1% to 5%, then the mean brightness value is applied as the reference brightness level. When the mean, median, and mode brightness values of all qualified pixels in the region 310 differ by a statistically significant percentage e.g., greater than 5% variation from each other, then mode is applicable as the reference brightness level. It is further noted that instead of limiting the region to area 310 for a statistical survey, the automated process may include other areas of the face, illustrated as 210 in FIG. 2. In an alternate embodiment, the first radius is provided as a user input, where a dark boundary region 330 is defined over the artifact region, e.g., region 320.

The processor 120 is configured to optionally receive a second selection pertaining to the digital image. This is also illustrated in block 410 of FIG. 4. Specifically, the second selection is for a smaller encompassment measure (e.g., second radius for a circular or oval area) than the first encompassment measure (e.g., first radius), and is typically in an area within the face regions 210 or, preferably, a neighboring pixel 225 to the artifacts 215-220. The processor 120 is configured via the code 125 to perform a blurring function as illustrated in block 415 of FIG. 4. Specifically, the processor 120 blurs a copy of the digital image using the first radius, thereby generating a first blurred image that is stored in the buffer 110. The processor is also configured to optionally blur a second copy of the digital image using the optional second radius to generate a second blurred image that is stored in the buffer. In an aspect of this disclosure, the blurring process is a Gaussian blurring function effected by the processor 120. The processor 120 is also configured to calculate the difference of Gaussians in a two-step process, as illustrated in functional block 420 of FIG. 4. A first difference of Gaussians is calculated of either, the digital image 200 (or section 310) or the optional second blurred image, from the first blurred image; and a second difference of Gaussians of the first blurred image from either, the digital image 200 (or section 310) or the optional second blurred image.

For purposes of simplicity herein, the reference to selections, or the first and second shapes are illustrated in the form of a circular shape with a radius encompassment measure as an example. This is not limiting to the disclosure herein, where the first or second selection is for an encompassment measure that may be a width or a side of length of a square or rectangular area over the artifact. The first or second selection may also include encompassment measures that are a minor radius or a major radius when contemplating an oval region encompassing the artifact. The blurring function is applicable to blur a digital image using any shape, so long as a measure of the shape is provided.

Figure 4:
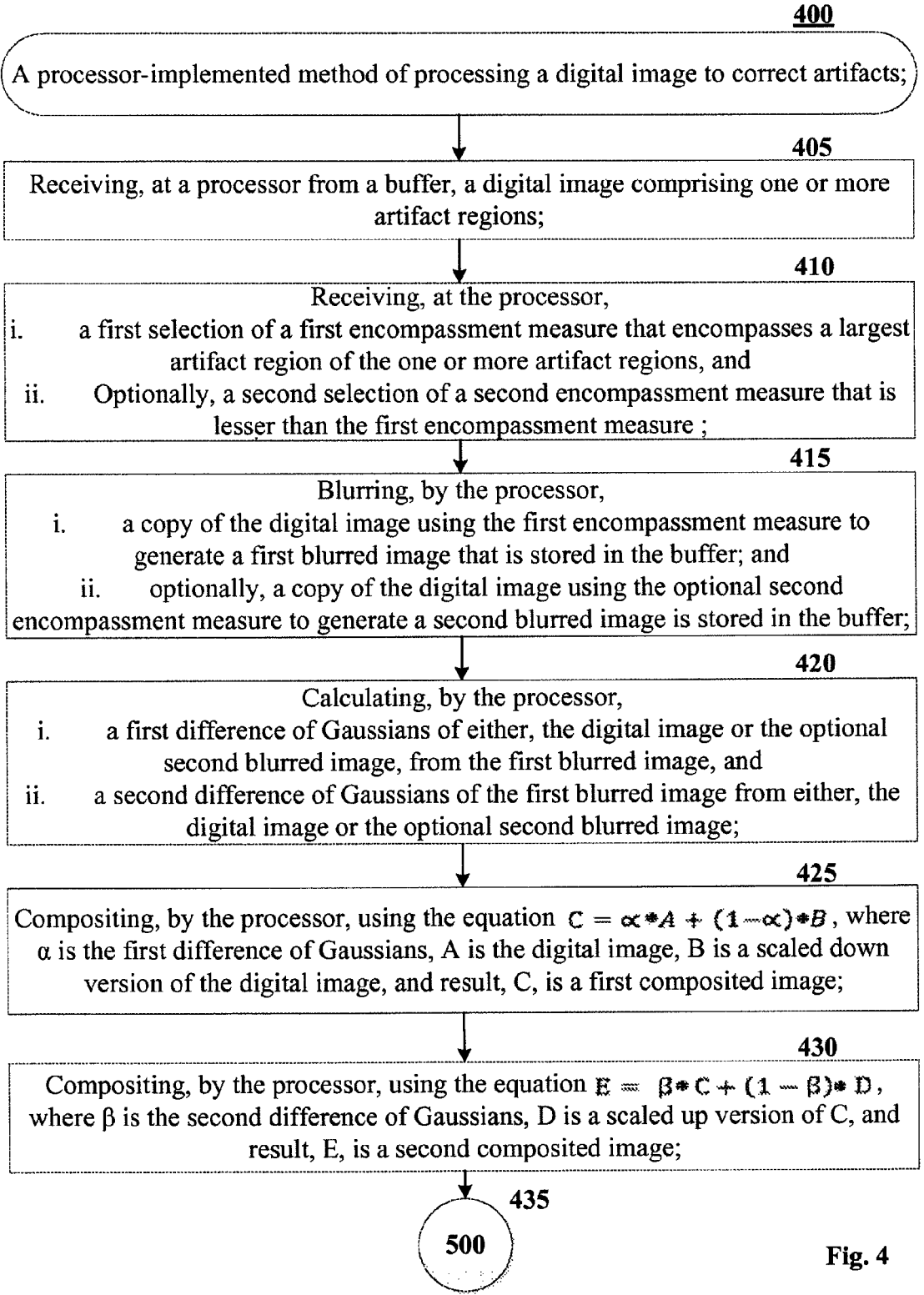
FIG. 4 illustrates a section of a flowchart of a processor-implemented method for image processing to correct artifacts in digital images, in accordance with one aspect of this disclosure.
Figure 5:
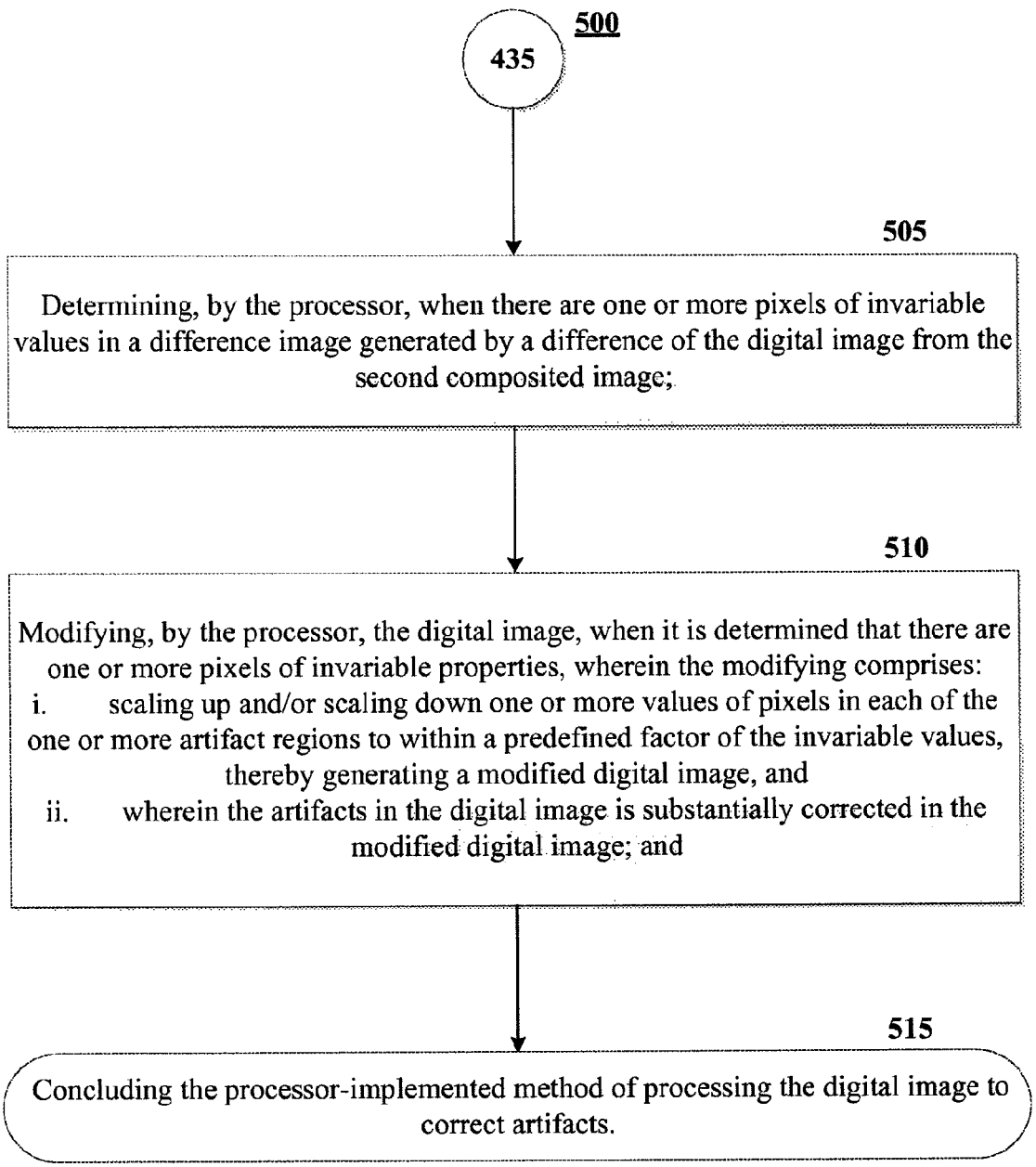
FIG. 5 illustrates a section of a continuing flowchart, from FIG. 4, of a processor-implemented method for image processing to correct artifacts in digital images, in accordance with one aspect of this disclosure.

The processor 120 is further configured to composite the digital image and the first and second differences of Gaussians as illustrated in blocks 425-430 of FIG. 4. In a first processing step of compositing, as illustrated by block 425, the processor 120 is configured to use equation $C=\alpha*A+(1-\alpha)*B$ (Equation 1), where $\alpha$ is the first difference of Gaussians, A is the digital image, B is a scaled version of the digital image, and result, C, is a first composited image. In a second processing step of compositing, as illustrated by block 430, the processor 120 is configured to use a second equation, $E=\beta C+(1-\beta)*D$ (Equation 2). Here, $\beta$ is the second difference of Gaussians, D is a scaled version of C that is oppositely scaled than the scaling used for B, and result, E, is a second composited image. In an example, if B is a scaled down version of the digital image then D is a scaled up version of C. Alternatively, if B is a scaled up version of the digital image then D is a scaled down version of C. The equations and method disclosed herein provides the same correction of artifacts in either scaling examples above. The first and second composited images may be stored in the memory component 110 along with (or by replacing) the blurred images. The functions then pass from block 435 of FIG. 4 to block 500 of FIG. 5.

At block 505, the method herein includes configuration for the processor 120 to determine when there are pixels of invariable values in a difference image that is generated by a difference of the digital image 200 from the second composited image. In a final step, illustrated in block 510, the processor 120 is configured to perform a modifying function, which pertains to the actual correcting of the artifacts. Specifically, the processor 120 modifies the digital image 200 (or section 310), when it is determined that there are pixels of invariable values. The modification includes, scaling up (applicable to lighter artifact 320) and/or scaling down (applicable to darker artifact 315) one or more values of pixels in each of the one or more artifact regions to within a predefined factor of the invariable values, thereby generating a modified digital image. Upon performing the scaling, the artifacts 315-320 in the digital image are substantially corrected in the modified digital image. Block 515 illustrates the conclusion of the processor-implemented method 400-500 of processing the digital image 200 by processor 120.

In an aspect of this invention, the scale up version D and the scale down version B of the digital image correspond to the digital image that has one or more of its pixels' properties changed by an increase or a decrease of its initial values. Specifically, the hue; saturation; color; brightness or offset; multiple or gain; and gamma values are property values that are available for the scaling functions. Furthermore, scaling includes a factoring by multiplication, division, addition, or subtraction. In an example, scaling is a proportional increase or decrease or a random increase or decrease of the initial values. A random increase, in an exemplary application, includes a scale up random value from 1 to 100 that is applicable to scale up the initial values by a multiplication or addition, thereby generating the scaled up version D. Similarly, a random decrease, in exemplary implementations, includes a scale down random value from 0 to 1 that s applicable to scale down the initial values of one or more of the pixels' properties, thereby generating the scaled down version B.

In the example of an x-ray, however, the undesired marking may represent an anomaly in a medical perspective—i.e., an abnormality in a patient. Accordingly, it is understood that the artifact in an x-ray image may be scaled up following the processing functions performed as described above. The processed x-ray image would, therefore, display more clearly, the abnormalities for the patient. This enables a doctor to view the x-ray image with more certainty as any artifact is displayed with more clarity or definition.

EXAMPLE

Figure 6:
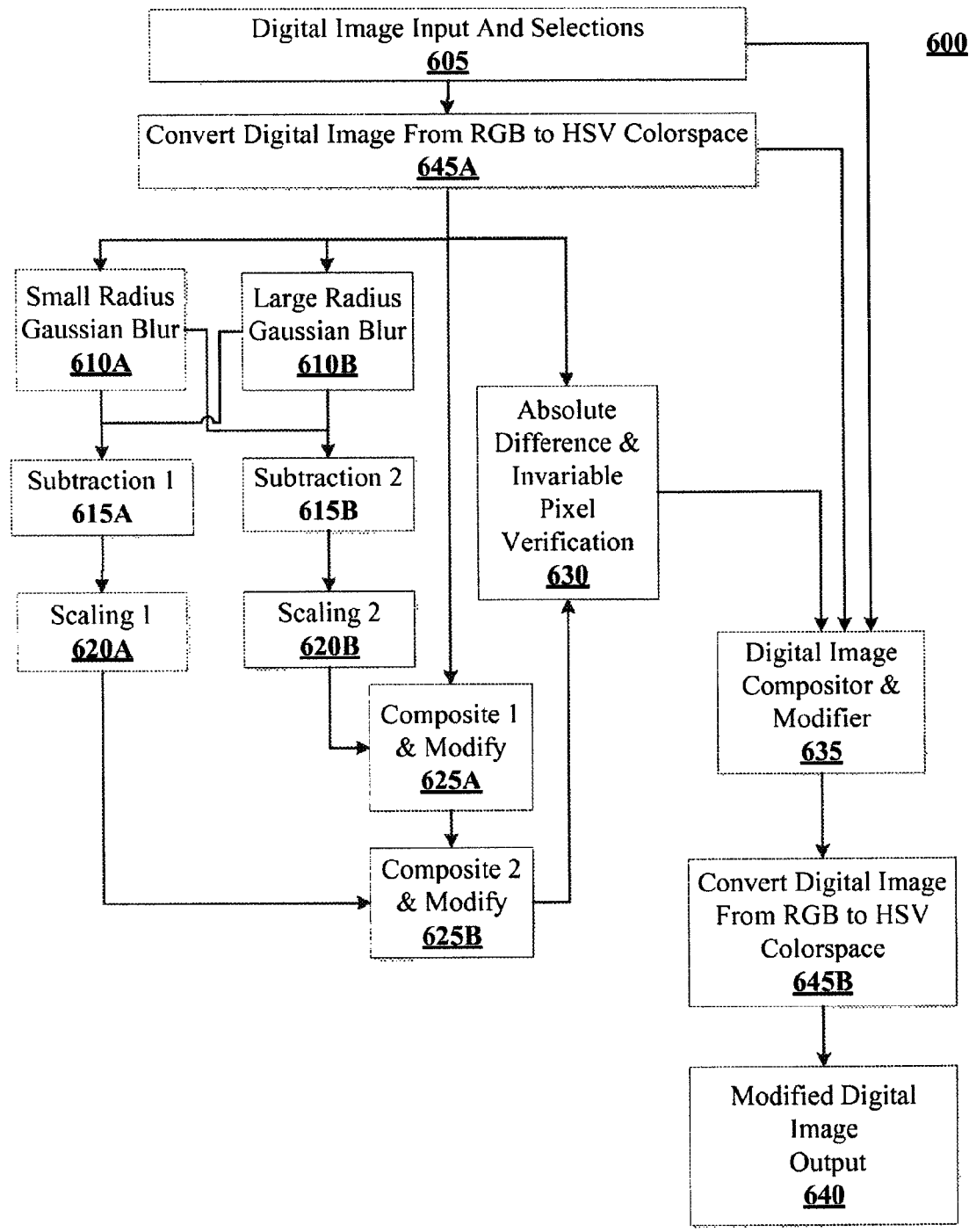
FIG. 6 illustrates an exemplary block structures for a processor-implemented method for image processing to correct artifacts in digital images, in accordance with one aspect of this disclosure.
Figure 7:
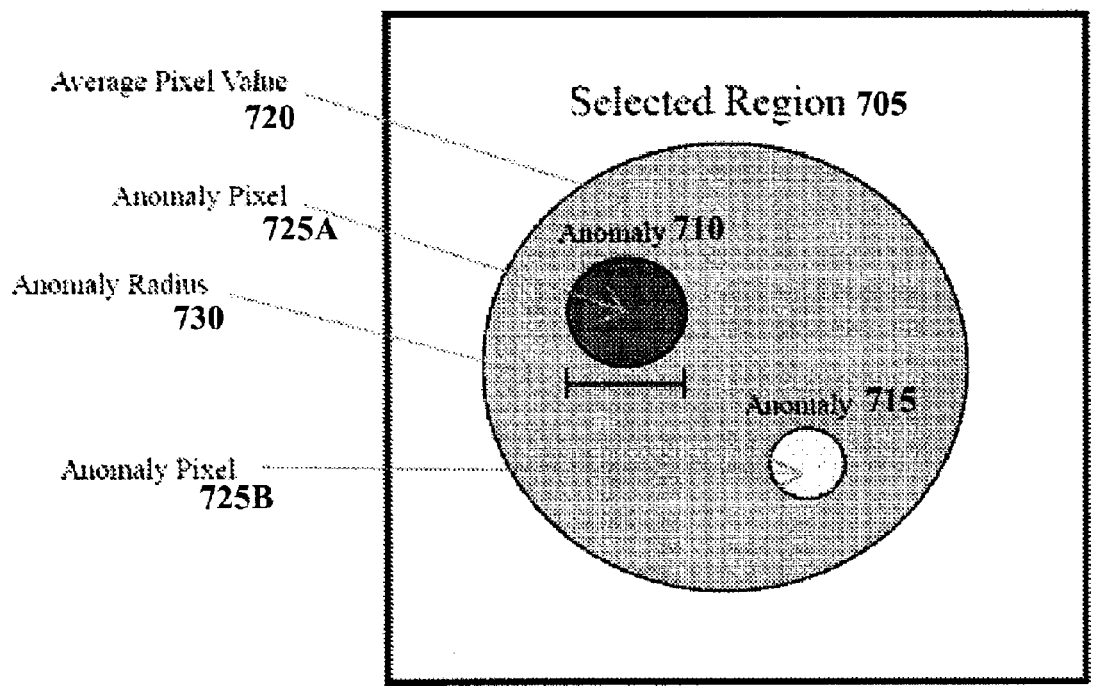
FIG. 7 illustrates an exemplary digital image subject to the correction processes of this disclosure.
Figure 8A:
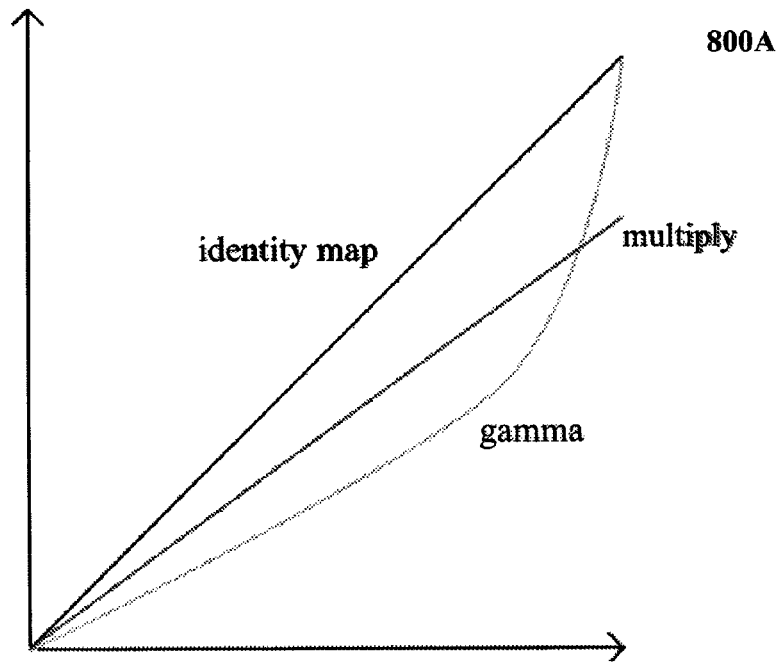
FIGS. 8A and 8B illustrate exemplary pixel properties, in the form of multiplication or gamma curves that are subject to modification by the correction processes of this disclosure.
Figure 8B:
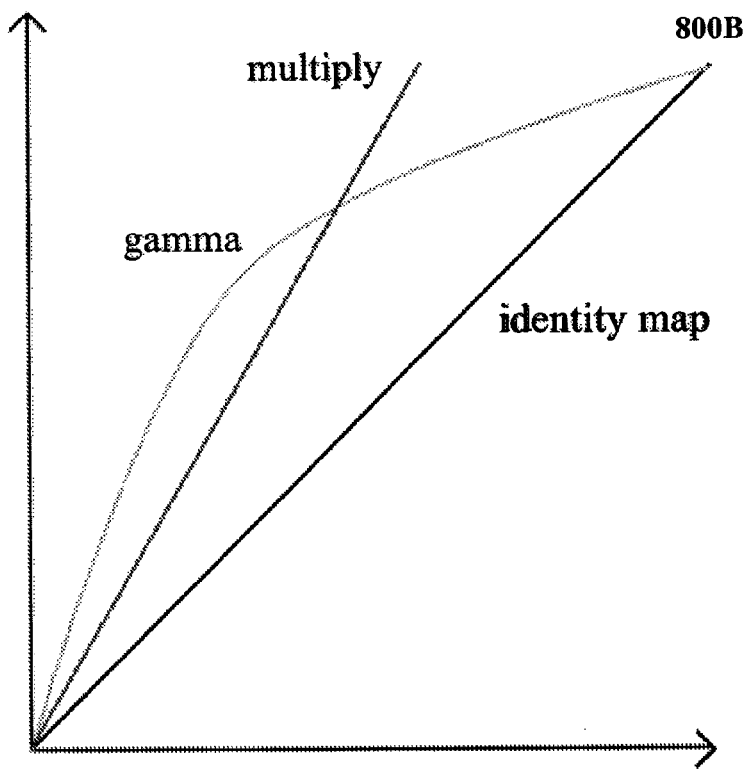

FIGS. 6-7 illustrate a processor-implemented method 600 for image processing to resolve or correct artifacts in digital images, in accordance with one aspect of this disclosure. FIG. 7 illustrates a digital image 700 with an optional selected region 705, including two artifacts 710-715. Block 605 illustrates a receiving function, where the digital image is received as an input by processor 120, similar to step 405 (of FIG. 4). The digital image received at 605 is an original digital image with one or more artifacts for resolution. Subsequent blocks 610-635 are processes performed as previously detailed with respect to blocks 410-430 of FIG. 4 and 505-510 of FIG. 5. Blocks 610A-B illustrate the use of the large radius and the optional small radius to perform the blurring function. In the illustrative digital image 700, the artifact or anomaly 710 is the largest radius artifact with a radius 730 that is applicable for automatic or manual selection. The artifacts include anomaly pixels 725A-B, which collectively represent the artifact discoloration. Blocks 615A-B illustrate the subtraction (difference of Gaussians) functions detailed previously, with respect to block 420 of FIG. 4. Typically, when the image is modified by the operations of blocks 610 and 615, some pixels may be lost. The scaling blocks 620A-B are included to scale the difference image to the pixel resolution of the original digital image. FIGS. 8A-B illustrate the modifications 800A-B (constituting multiplication or gamma curves) applied to the original RGB pixel values to produce new values which represent the modified image outputs of block 625A-B, respectively.

Block 625A represents the first compositing step, corresponding to block 425 of FIG. 4, while block 625B represents the second compositing step, corresponding to block 430 of FIG. 4. Since the first compositing step 625A essentially modifies the original digital image and the second compositing step 625B essentially modifies the output of block 625A, they are both referred to as "composite and modify" blocks. The absolute difference and invariable pixel verification is performed via block 630. This step corresponds to the functions of block 505 in FIG. 5. Finally, modification is performed via block 635 to output the modified digital image at block 640. This final step corresponds to block 510 of FIG. 5.

In an exemplary implementation, block 635 is a digital image compositor and modifier that is very similar to blocks 625A-B, except that it uses, as at least one input, a scaled image incorporating the invariant pixel values in its compositing and modification functions. Specifically, after the invariant pixel has been found via block 630, the processor 120 is configured to modify and composite the digital image from input block 605 using a scaled image that is fully scaled so that its pixel properties in the artifact regions incorporate values from the invariant pixel properties. The following description of the digital image compositor and modifier 635 is one example for performing the modification functions described in block 510 of FIG. 5. The digital mage compositor and modifier 635 use the same α and β values from Equations 1 and 2, respectively, in its compositing equation. Accordingly, block 635 applies a third compositing function using equation $G = \alpha A + (1-\alpha)*F$ (Equation 3), where α is the first difference of Gaussians from Equation 1; A is the digital image; F is a scaled version of the digital image, which incorporates a predefined factor of the invariant pixel values; and result, G, is a third composited image (different from the outputs of blocks 625). Block 635 also includes a fourth compositing function for the output of the third compositing function. The fourth compositing function is $I = \beta*G + (1-\beta)*H$ (Equation 4). Here, β is the second difference of Gaussians from Equation 2; H is a scaled version of G incorporating a predefined factor of the invariant pixel values; and result, I, is a composited image that is either the final RGB image or a greyscale version. The third and fourth composited images may be stored in the memory component 110. The fourth composited image "I" may then pass to block 645B for conversion of colorspace before being output via block 640.

As described above, in an aspect of the disclosure, intervening steps 645A-B may be added for conversion of red, blue, green (RGB) to hue-saturation-value (HSV) colorspace. When the intervening steps are in place, the input digital image is first converted via block 645A. Conversion of the color space allows operations on variations as to certain pixel properties during the composite and modification processes, including scaling of brightness, hue, saturation in the final modified digital image. The HSV image is subject to the processing of steps 610-635, as described above. The image output of block 635 is then converted back from HSV or any grey scale colorspace to the RGB. CMYK, or any multi-channel colorspace via 645B, thereby resulting in a modified and corrected digital image output that is substantially free of artifacts.

Figure 9:
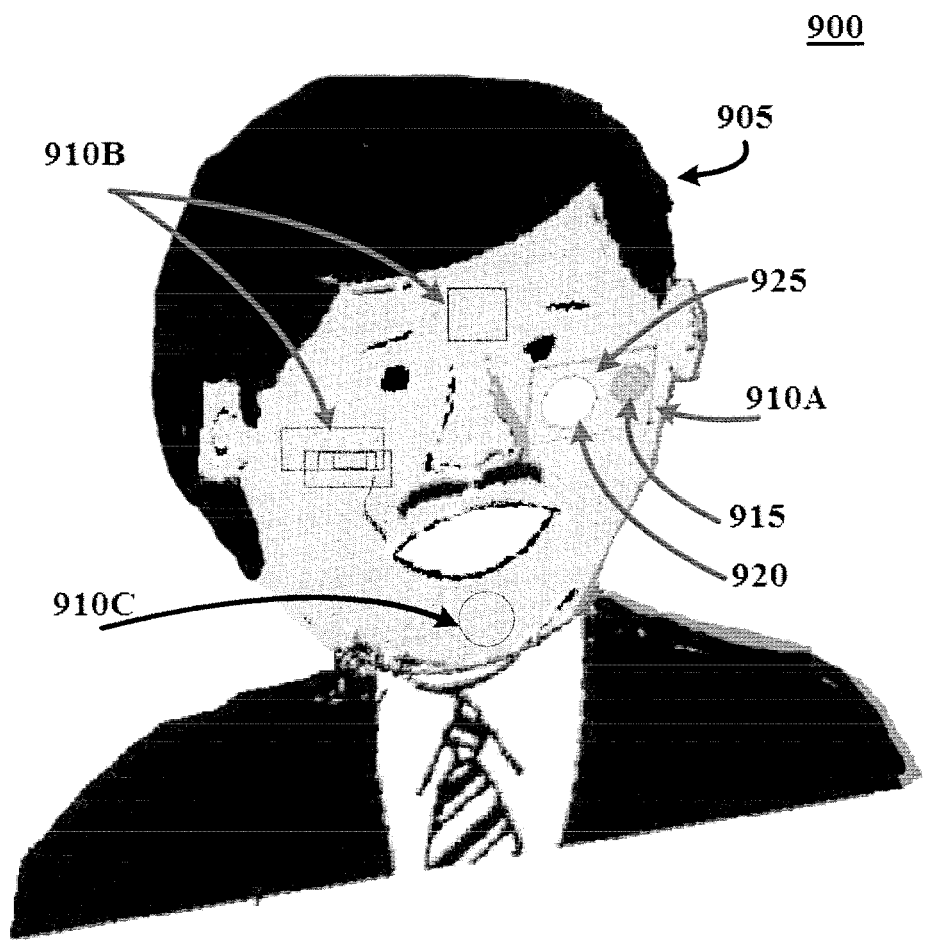
FIG. 9 illustrates an exemplary digital image screen grab from a 3D image, which includes artifacts, and which is subject to the processor-implemented method and system for image processing to correct the artifacts.
Figure 10:
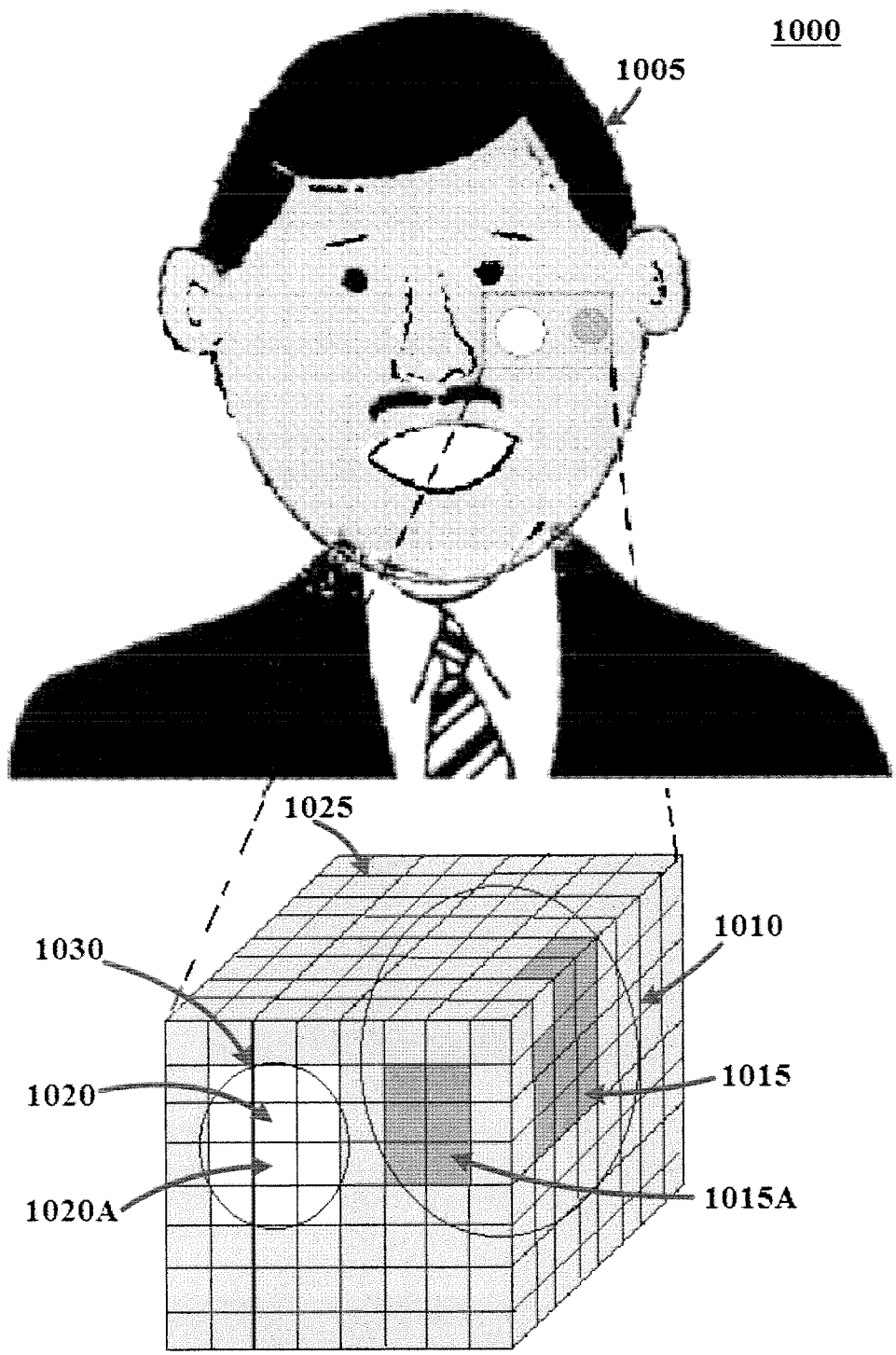
FIG. 10 illustrates blow-up detail of the artifacts from the exemplary digital image of FIG. 9, which is subject to the processor-implemented method and system for image processing to correct the artifacts.

FIGS. 9-10 illustrate processor-implemented method 600 for image processing to resolve or correct artifacts in digital images, in accordance with one aspect of this disclosure. In the example of FIG. 9, the digital image includes a human face 905, similar to digital image 200, except that FIG. 9 is an illustration of a screen grab of a 3D rotated version of the 2D image 200 from FIG. 2. Specifically, FIG. 9 illustrates a human face 905 in a different perspective from face 205, because it is a slightly rotated view, showing depth of the face. A person of ordinary skill would also recognize that the present invention is performed on a computer and that FIGS. 9-10 are exemplary to illustrate how the present disclosure corrects artifacts in 3D images using voxels or volume pixel.

Feature separation, as discussed with respect to the embodiment of FIG. 2 is applicable to the 3D embodiments of FIGS. 9-10 in order to separate the human face 905 from any other 3D article provided in a screen grab as described above; then correcting functions of this invention are separately applicable to any artifacts that exist on each separated feature. Considering the specific case of the human face 905, and even more specifically, the region 910A as the digital image of the 3D face in a monitor, the artifacts 915-920 are illustrated as discolorations to the face. The artifacts are typically areas of voxels in which artifact features, for example, brightness, hue, saturation, and/or colors levels, mismatch when compared to neighboring regions of the same facial area. Areas of neighboring regions, include, for example, the rest of the cheek 925 or face 910. Voxels are detailed further in this disclosure below.

The image illustrated in FIG. 10 is a blow-up 1005 of the human face 905 of the digital image 900 of FIG. 9, focusing on one angle of the perspective view. As explained with respect to FIG. 9, the blow-up 1005 is merely illustrative of the 3D image which will have additional information besides the pixels. Specifically, the image is typically comprised of voxels, illustrated as cubes 1025 in FIG. 1000. As with pixels, each voxel represents a data point in a three dimensional image and can include data, such as opacity, brightness, color information and other pertinent information, at that data point. Accordingly, the properties of a pixel as described earlier in this disclosure are applicable to a voxel, including without limitation, at least the data values corresponding to multiple or gain; offset or brightness; and gamma. As in the case of a two dimensional image, a three dimensional image may be edited by changing its collective properties, which, in turn, proportionally changes the properties' values in each voxel. Alternatively, to edit a digital image, one can change the properties of individual voxels or groups of voxels using arbitrary values or proportional values.

The voxels 1025 are further divided into predetermined areas of voxels 910-920 for purposes of illustration. The predetermined areas 1010 and 1030 illustrate the details of artifact regions 915 and 920. Furthermore, the artifact regions illustrate that they are comprised of more differently colored voxels than the neighboring areas 925. Accordingly, a feature separation for the two artifact regions may be performed by a processor using the difference in majority properties of voxels in the areas 915 and 920 in comparison to the general area 910. The artifacts and the features are not clearly divided at the boundary, but feature separation includes certain voxels of different colors as well, while retaining a majority of voxels of different color from the rest of the image. The digital images in this method can include three dimensional images with an optional selected region, similar to the selection 705 of FIG. 7, with two artifacts 710-715. In the three dimensional images, voxels replace the pixels.

As explained above. FIG. 6 illustrates a processor-implemented method 600 for image processing to resolve or correct artifacts in digital images, in accordance with one aspect of this disclosure. The process corresponding to FIG. 6 is applicable to resolve or correct artifacts in digital images with the 3D voxels as explained below. Block 605 illustrates a receiving function, where the 3D digital image with voxels is received as an input by processor 120, similar to step 405 (of FIG. 4). The 3D digital image received at 605 is an original 3D digital image with one or more artifacts 915-920 for resolution. Subsequent blocks 610-635 are processes performed as previously detailed with respect to blocks 410-430 of FIG. 4 and 505-510 of FIG. 5. Specifically, the processor 120 is configured to optionally receive a second selection pertaining to the 3D digital image, as was done in block 410 of FIG. 4. Specifically, the second selection is for a smaller encompassment measure (e.g., second radius for a circular or oval area) than the first encompassment measure (e.g., first radius), and is typically in an area within the face regions 910 or, preferably, a neighboring pixel 925 to the artifacts 915-920. The encompassment measures of the first and second selections draw from a perspective view in a 3D image and could extend through the views of the 3D image using a spherical, cylindrical, or a cuboidal relationship to the circular, oval, square, or rectangular selections in a 2D perspective to cover neighboring voxels in the depth of the image. Specifically, if a circular region is drawn in the 2D view to cover a front facing artifact, when the view is rotated, the circular region could be extended to a sphere of the same radius as the circle to cover artifact voxels in the rotated view. Further, should the artifact extend through the rotated view beyond the radius of the sphere, the sphere could be changed to a spheroid or cylinder representing a selection of the extended artifact through the rotated view, while the circular ends of the cylinder encompass the same artifact in the front facing view.

Blocks 610A-B illustrate the use of the large radius and the optional small radius to perform the blurring function. In the illustrative 3D digital image 900, the artifact or anomaly 920 is the largest radius artifact with a radius (as illustrated in the 2D image of FIG. 7 using element numeral 730) that is applicable for automatic or manual selection. In this non-limiting example, the 3D radius is a radius of a sphere and not merely a radius of a circle. The artifacts in the 3D include anomaly voxels 1020A and 1015A (replacing pixels 725A-B) in the process of FIG. 6, which collectively represents the artifact discoloration. Blocks 615A-B illustrate the subtraction (difference of Gaussians) functions detailed previously, with respect to block 420 of FIG. 4. Specifically, the processor 120 is also configured to calculate difference of Gaussians in a two-step process, as illustrated in functional block 420 of FIG. 4. A first difference of Gaussians is calculated of either, the 3D digital image 900 (or section 910) or the optional second blurred 3D image, from the first blurred 3D image; and a second difference of Gaussians of the first blurred 3D image from either, the 3D digital image 900 (or section 910) or the optional second blurred 3D image.

Typically, when the image is modified by the operations of blocks 610 and 615, some voxels may be lost. The scaling blocks 620A-B are included to scale the difference image to the voxel resolution of the original digital image. FIGS. 8A-B illustrate the modifications 800A-B (constituting multiplication or gamma curves) applied to the original RGB voxel values to produce new values which represent the modified image outputs of block 625A-B, respectively.

Block 625A represents the first compositing step, corresponding to block 425 of FIG. 4, while block 625B represents the second compositing step, corresponding to block 430 of FIG. 4. In a first processing step of compositing, as illustrated by block 425, the processor 120 is configured to use equation $C=\alpha*A+(1-\alpha)*B$ (Equation 1), where $\alpha$ is the first difference of Gaussians. A is the 3D digital image. B is a scaled version of the 3D digital image, and result, C, is a first composited 3D image. In a second processing step of compositing, as illustrated by block 430, the processor 120 is configured to use a second equation, $E=\beta C+(1-\beta)*D$ (Equation 2). Here, $\beta$ is the second difference of Gaussians, D is a scaled version of C that is oppositely scaled than the scaling used for B, and result, E, is a second composited 3D image. In an example, if B is a scaled down version of the 3D digital image then D is a scaled up version of C. Alternatively, if B is a scaled up version of the 3D digital image then D is a scaled down version of C. The equations and method disclosed herein provides the same correction of artifacts in either scaling examples above. The first and second composited 3D images may be stored in the memory component 110 along with (or by replacing) the blurred images. The functions then pass from block 435 of FIG. 4 to block 500 of FIG. 5. Since the first compositing step 625A essentially modifies the original 3D digital image and the second compositing step 625B essentially modifies the output of block 625A, they are both referred to as "composite and modify" blocks. Further, each of the variables in equations 1 and 2 are represented as 3D values, such as in a 3D matrix. For example, each of variables, A, B, C, D, E, $\alpha$, and $\beta$ are in the form of rotation matrices in Euclidean space.

The absolute difference and invariable voxel verification is performed via block 630. This step corresponds to the functions of block 505 in FIG. 5. At block 505, the method herein includes configuration for the processor 120 to determine when there are voxels of invariable values in a difference image that is generated by a difference of the 3D digital image 900 from the second composited 3D image. Finally, modification is performed via block 635 to output the modified digital image at block 640. This final step corresponds to block 510 of FIG. 5. Specifically, the processor 120 modifies the 3D digital image 900 (or section 910), when it is determined that there are voxels of invariable values. The modification includes, scaling up (applicable to lighter artifact 920) and/or scaling down (applicable to darker artifact 915) one or more values of voxels in each of the one or more artifact regions to within a predefined factor of the invariable values, thereby generating a modified digital image. Upon performing the scaling, the artifacts 915-920 in the 3D digital image are substantially corrected in the modified 3D digital image. Block 515 illustrates the conclusion of the processor-implemented method 400-500 of processing the digital mage 900 by processor 120.

In an exemplary implementation, block 635 is a digital image compositor and modifier that is very similar to blocks 625A-B, except that it uses, as at least one input, a scaled 3D image incorporating the invariant voxel values in its compositing and modification functions. Specifically, after the invariant voxel has been found via block 630, the processor 120 is configured to modify and composite the 3D digital image from input block 605 using a scaled 3D image that is fully scaled so that its voxel properties in the artifact regions incorporate values from the invariant voxel properties. The following description of the digital image compositor and modifier 635 is one example for performing the modification functions described in block 510 of FIG. 5 to the 3D image 900. The digital image compositor and modifier 635 use the same $\alpha$ and $\beta$ values from Equations 1 and 2, respectively, in its compositing equation. Accordingly, block 635 applies a third compositing function using equation $G=\alpha A+(1-\alpha)*F$ (Equation 3), where $\alpha$ is the first difference of Gaussians from Equation 1; A is the 3D digital image; F is a scaled version of the 3D digital image, which incorporates a predefined factor of the invariant voxel values; and result, G, is a third composited image (different from the outputs of blocks 625). Block 635 also includes a fourth compositing function for the output of the third compositing function. The fourth compositing function is $I=\beta*G+(1-\beta)*H$ (Equation 4). Here, $\beta$ is the second difference of Gaussians from Equation 2; H is a scaled version of G incorporating a predefined factor of the invariant voxel values; and result, I, is a composited image that is either the final RGB image or a greyscale version. The third and fourth composited images may be stored in the memory component 110. The fourth composited image "I" may then pass to block 645B for conversion of colorspace before being output via block 640. As in the case of equations 1 and 2, each of variables. F, G, H, I, $\alpha$, and $\beta$ are in the form of rotation matrices in Euclidean space.

As described above, in an aspect of the disclosure, intervening steps 645A-B may be added for conversion of red, blue, green (RGB) to hue-saturation-value (HSV) colorspace. When the intervening steps are in place, the input digital image is first converted via block 645A. Conversion of the color space allows operations on variations as to certain voxel properties during the composite and modification processes, including scaling of brightness, hue, saturation in the final modified digital image. The HSV image is subject to the processing of steps 610-635, as described above. The image output of block 635 is then converted back from HSV or any greyscale colorspace to the RUB, CMYK, or any multi-channel colorspace via 645B, thereby resulting in a modified and corrected digital image output that is substantially free of artifacts.

The exemplary methods and acts described in the implementations presented previously are illustrative, and, in alternative implementations, certain acts can be performed in a different order, in parallel with one another, omitted entirely, and/or combined between different exemplary implementations, and/or certain additional acts can be performed without departing from the scope and spirit of the disclosure. Accordingly, such alternative implementations are included in the disclosures described herein.

The exemplary implementations can be used with computer hardware and software that perform the methods and processing functions described above. Exemplary computer hardware include smart phones, tablet computers, notebooks, notepad devices, personal computers, personal digital assistances, and any computing device with a processor and memory area. A person having ordinary skill in that art will appreciate that the systems, methods, and procedures described herein can be embodied in a programmable computer, computer executable software, or digital circuitry. The software can be stored on computer readable media. For example, "firmware." "computer code," "computer-readable code," "application," "software module," "scripts," and "computer software code" are software/firmware codes used interchangeably for the purposes of simplicity in this disclosure. Further, "memory product," "memory," "computer readable medium" and storage can include such media as floppy disk, RAM, ROM, hard disk, removable media, flash memory, memory stick, optical media, magnetooptical media, CD-ROM, etc.

Although specific implementations have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary implementations, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A processor-implemented method of processing a digital image to correct artifacts, the processor-implemented method comprising:
   (a) receiving, at a processor from a buffer, a digital image comprising one or more artifact regions;
   (b) receiving, at the processor,
      a first selection of a first encompassment measure that encompasses a largest artifact region of the one or more artifact regions;
   (c) blurring, by the processor,
      a copy of the digital image using the first encompassment measure to generate a first blurred image that is stored in the buffer;
   (d) calculating, by the processor,
      i. a first difference of Gaussians of, the digital image from the first blurred image
      ii. a second difference of Gaussians of the first blurred image from the digital image;
   (e) compositing, by the processor, using the equation $C=\alpha*A+(1-\alpha)*B$, where $\alpha$ is the first difference of Gaussians, A is the digital image, B is a scaled version of the digital image, and result, C, is a first composited image;
   (f) compositing, by the processor, using the equation $E=\beta*C+(1-\beta)*D$, where $\beta$ is the second difference of Gaussians, D is a scaled version of C and is oppositely scaled than the scaling used for B, and result, E, is a second composited image; and
   (g) modifying, by the processor, the digital image, when it is determined that there are one or more pixels of invariable values in a difference image that is generated by a difference of the digital image from the second composited image, wherein the modifying comprises:

scaling one or more values of pixels in each of the one or more artifact regions to within a predefined factor of the invariable values, thereby generating a modified digital image, and wherein a correction to the artifacts in the digital image is provided in the modified digital image.

2. The processor-implemented method of claim 1, further comprising:
repeating, by the processor, steps (c)-(g) using a modified blurred image, wherein the modified blurred image is generated by scaling up a second encompassment measure that is obtained from a second selection of a second encompassment measure, the scaling up by at least one unit when it is determined that the second encompassment measure is less than the first encompassment measure.

3. The processor-implemented method of claim 1, wherein the blurring is a Gaussian blurring.

4. The processor-implemented method of claim 1, wherein the first encompassment measure is represented in units of pixels.

5. The processor-implemented method of claim 1, wherein the compositing comprises alpha compositing.

6. The processor-implemented method of claim 1, wherein B is a scaled up version of the digital image and corresponds to the digital image that has one or more of its pixels' properties changed by an increase of its initial values.

7. The processor-implemented method of claim 6, wherein the one or more properties comprise multiple or gain; offset or brightness; or gamma.

8. The processor-implemented method of claim 6, wherein the increase from the initial values is one or more of: a proportional increase or a random increase, and wherein the random increase is by a scale up random value from 1 to 100 to scale up the initial values.

9. The processor-implemented method of claim 8, wherein the scaled up version of the digital image is obtained by the random increase using a multiplication function on the initial values, thereby multiplying the initial values by the scale up random value.

10. The processor-implemented method of claim 1, wherein the scaling is a scaling up of the one or more values of pixels by increasing one or more property values of the pixels, wherein the one or more property values comprise values for multiple or gain; offset or brightness; or gamma.

11. The processor-implemented method of claim 1, wherein the predefined factor of the invariable values is +/−10% of the invariable values.

12. The processor-implemented method of claim 1, wherein the correction corresponds to a modification of the digital image to make the artifact regions more differentiable to a human eye reviewing the modified digital image when compared with the digital image.

13. The processor-implemented method of claim 1, wherein step (g) for modifying the digital image comprises:
i. compositing, using equation $G=\alpha*A+(1-\alpha)*F$, where F is a scaled up version of the digital image using the predefined factor of the invariable values for scaling, and result, G, is a third composited image; and
ii. compositing, using equation $I=\beta*G+(1-\beta)*H$, where H is a scaled down version of G using the predefined factor of the invariable values for scaling, and result, I, is the modified digital image or a greyscale version of the modified digital image.

14. The processor-implemented method of claim 13, wherein the result, I, is converted from a greyscale colorspace to an RGB, CMYK, or any multichannel colorspace, when the result, I, is a greyscale formatted image.

15. The processor-implemented method of claim 13, wherein the digital image A is first converted from a CMYK, an RGB, or any multichannel colorspace to an HSV, Lab, or any greyscale colorspace, prior to performing the functions of steps (c)-(g).

16. The processor-implemented method of claim 1, wherein
i. the digital image A comprises red, a green, or a blue component images of a full color digital image;
ii. each of the red, the green, and the blue component images are subject to the same selections of step (b);
iii. each of the red, the green, and the blue component images are subject to the steps (c)-(g); and
iv. a final compositing step is performed to combine each of the modified digital images of step (g) corresponding to the red, the green, and the blue component images, thereby producing a final composited version of the digital image, the final composited version of the digital image comprising the correction to the artifacts is provided in the digital image.

17. A processor-implemented system for processing a digital image to correct artifacts, the processor-implemented system comprising:
a buffer; and
a processor coupled to the buffer, the processor configured to:
(a) receive a digital image comprising one or more artifact regions;
(b) receive:
a first selection of a first encompassment measure that encompasses a largest artifact region of the one or more artifact regions;
(c) blur:
a copy of the digital image using the first encompassment measure to generate a first blurred image that is stored in the buffer;
(d) calculate:
i. a first difference of Gaussians of the digital image from the first blurred image, and
ii. a second difference of Gaussians of the first blurred image from the digital image;
(e) composite, using the equation $C=\alpha*A+(1-\alpha)*B$, where $\alpha$ is the first difference of Gaussians, A is the digital image, B is a scaled version of the digital image, and result, C, is a first composited image;
(f) composite, using the equation $E=\beta*C+(1-\beta)*D$, where $\beta$ is the second difference of Gaussians, D is a scaled version of C and is oppositely scaled than the scaling used for B, and result, E, is a second composited image; and
(g) modify the digital image, when it is determined that there are one or more pixels of invariable values in a difference image that is generated by a difference of the digital image from the second composited image, wherein the modifying comprises:
scaling one or more values of pixels in each of the one or more artifact regions to within a predefined factor of the invariable values, thereby generating a modified digital image, and wherein a correction to the artifacts in the digital image is provided in the modified digital image.

18. The processor-implemented system of claim 17, further comprising: the processor configured to repeat steps (c)-(g) using a modified blurred image, wherein the modified blurred image is generated by scaling up a second encompassment measure that is obtained from a second selection of a second encompassment measure, the scaling up by at least one unit when it is determined that the second encompassment measure is less than the first encompassment measure.

19. The processor-implemented system of claim 17, wherein the processor is configured to blur using Gaussian blurring.

20. The processor-implemented system of claim 17, wherein the processor is configured to receive the first encompassment measure in units of pixels.

21. The processor-implemented system of claim 17, wherein the processor is configured to perform alpha compositing.

22. The processor-implemented system of claim 17, wherein the processor is configured to provide B as a scaled up version of the digital image and as corresponding to the digital image that has one or more of its pixels' properties changed by an increase of its initial values.

23. The processor-implemented system of claim 22, wherein the processor is configured to change one or more properties comprising multiple or gain; offset or brightness; or gamma.

24. The processor-implemented system of claim 22, wherein the processor is configured to increase the initial values by one or more of: a proportional increase or a random increase, and wherein the random increase is by a scale up random value from 1 to 100 to scale up the initial values.

25. the processor-implemented system of claim 24, wherein the processor is configured for the random increase using a multiplication function on the initial values, thereby multiplying the initial values by the scale up random value.

26. The processor-implemented system of claim 17, wherein the processor is configured for the scaling of the one or more values of pixels by increasing one or more property values of the pixels, wherein the one or more property values comprise values for multiple or gain; offset or brightness; or gamma.

27. the processor-implemented system of claim 17, wherein the processor is configured to use +/−10% of the invariable values as the predefined factor of the invariable values.

28. The processor-implemented system of claim 17, wherein the processor is configured to apply the correction, thereby providing a modification of the digital image to make the artifact regions more differentiable to a human eye reviewing the modified digital image when compared with the digital image.

29. The processor-implemented system of claim 17, wherein the processor is configured to perform step (g) for modifying the digital image by:
  i. compositing, using equation $G=\alpha*A+(1-\alpha)*F$, where F is a scaled up version of the digital image using the predefined factor of the invariable values for scaling, and result, G, is a third composited image; and
  ii. compositing, using equation $I=\beta*G+(1-\beta)*H$, where H is a scaled down version of G using the predefined factor of the invariable values for scaling, and result, I, is the modified digital image or a greyscale version of the modified digital image.

30. The processor-implemented system of claim 29, wherein the processor is configured to convert the result, I, from a greyscale colorspace to an RGB, CMYK, or any multichannel colorspace, when the result, I, is a greyscale formatted image.

31. The processor-implemented system of claim 29, wherein the processor is configured to first convert the digital image A from a CMYK, an RGB, or any multi-channel colorspace to an HSV, Lab, or any greyscale colorspace, prior to performing the functions of steps (c)-(g).

32. The processor-implemented system of claim 17, wherein the processor is configured to:
  i. receive the digital image A in a format comprising red, a green, or a blue component images of a full color digital image;
  ii. receive the same selections of step (b) for each of the red, the green, and the blue component images;
  iii. process, according to steps (c)-(g), each of the red, the green, and the blue component images; and
  iv. composite, as a final compositing step, each of the modified digital images of step (g) corresponding to the red, the green, and the blue component images, thereby producing a final composited version of the digital image, the final composited version of the digital image comprising the correction to the artifacts is provided in the digital image.

33. A processor-implemented method of processing a digital image to correct artifacts, the processor-implemented method comprising:
  (a) receiving, at a processor from a buffer, a digital image comprising one or more artifact regions;
  (b) receiving, at the processor,
    a first selection of a first encompassment measure that encompasses a largest artifact region of the one or more artifact regions;
  (c) blurring, by the processor,
    a copy of the digital image using the first encompassment measure to generate a first blurred image that is stored in the buffer;
  (d) calculating, by the processor,
    i. a difference of Gaussians of the digital image from the first blurred image, and
    ii. a second difference of Gaussians of the first blurred image from the digital image;
  (e) compositing, by the processor, using the equation $C=\alpha*A+(1-\alpha)*B$, where $\alpha$ is the first difference of Gaussians, A is the digital image, B is a scaled version of the digital image, and a result, C, is a first composited image;
  (f) compositing, by the processor, using the equation $E=\beta*C+(1-\beta)*D$, where $\beta$ is the second difference of Gaussians, D is a scaled version of C and is oppositely scaled than the scaling used for B, and result, E, is a second composited image; and
  (g) modifying, by the processor, the digital image, when it is determined that there are one or more voxels of invariable values in a difference image that is generated by a difference of the digital image from the second composited image, wherein the modifying comprises:
    scaling one or more values of voxels in each of the one or more artifact regions to within a predefined factor of the invariable values, thereby generating a modified digital image, and
    wherein a correction to the artifacts in the digital image is provided in the modified digital image.

34. The processor-implemented system of claim 33, wherein the digital image is a portion or a separated feature from an image file.

35. The processor-implemented method of claim 1, wherein the correction corresponds to a modification of the digital image to make the artifact regions less differentiable to a human eye reviewing the modified digital image when compared with the digital image.

36. The processor-implemented method of claim 1, wherein B is a scaled down version of the digital image and corresponds to the digital image that has one or more of its pixels' properties changed by a decrease of its initial values.

37. The processor-implemented method of claim 36, wherein the decrease from the initial values is one or more of: a proportional decrease or a random decrease, and wherein the random decrease is by a scale down random value from 0 to 1 to scale down the initial values.

38. The processor-implemented method of claim 1, wherein the scaling is a scaling down of the one or more values of pixels comprises by decreasing one or more property values of the pixels, wherein the one or more property values comprise values for multiple or gain; offset or brightness; or gamma.

39. The processor-implemented method of claim 1, wherein step (g) for modifying the digital image comprises:
  i. compositing, using equation $G=\alpha*A+(1-\alpha)*F$, where F is a scaled down version of the digital image using the predefined factor of the invariable values for scaling, and result, G, is a third composited image; and
  ii. compositing, using equation $I=\beta*G+(1-\beta)*H$, where H is a scaled up version of G using the predefined factor of the invariable values for scaling, and result, I, is the modified digital image or a greyscale version of the modified digital image.

40. The processor-implemented system of claim 17, wherein the processor is configured to apply the correction, thereby providing a modification of the digital image to make the artifact regions less differentiable to a human eye reviewing the modified digital image when compared with the digital image.

41. A processor-implemented method of processing a digital image to correct artifacts, the processor-implemented method comprising:
  (a) receiving, at a processor from a buffer, a digital image comprising one or more artifact regions;
  (b) receiving, at the processor,
    i. a first selection of a first encompassment measure that encompasses a largest artifact region of the one or more artifact regions, and
    ii. a second selection of a second encompassment measure that is lesser than the first encompassment measure;
  (c) blurring, by the processor,
    i. a copy of the digital image using the first encompassment measure to generate a first blurred image that is stored in the buffer, and
    ii. a copy of the digital image using the second encompassment measure to generate a second blurred image is stored in the buffer;
  (d) calculating, by the processor,
    i. a first difference of Gaussians of either, the digital image or the second blurred image, from the first blurred image, and
    ii. a second difference of Gaussians of the first blurred image from either, the digital image or the second blurred image;
  (e) compositing, by the processor, using the equation $C=\alpha*A+(1-\alpha)*B$, where $\alpha$ is the first difference of Gaussians, A is the digital image, B is a scaled version of the digital image, and result, C, is a first composited image;
  (f) compositing, by the processor, using the equation $E=\beta*C+(1-\beta)*D$, where $\beta$ is the second difference of Gaussians, D is a scaled version of C and is oppositely scaled than the scaling used for B, and result, E, is a second composited image;
  (g) determining, by the processor, when there are one or more pixels of invariable values in a difference image that is generated by a difference of the digital image from the second composited image; and
  (h) modifying, by the processor, the digital image, when it is determined that there are one or more pixels of invariable values, wherein the modifying comprises:
    scaling one or more values of pixels in each of the one or more artifact regions to within a predefined factor of the invariable values, thereby generating a modified digital image, and wherein a modification to the artifacts in the digital image is provided in the modified digital image.

* * * * *